July 21, 1964
H. L. STULL
3,141,257
LIVE FISH CONTAINER
Filed April 1, 1963
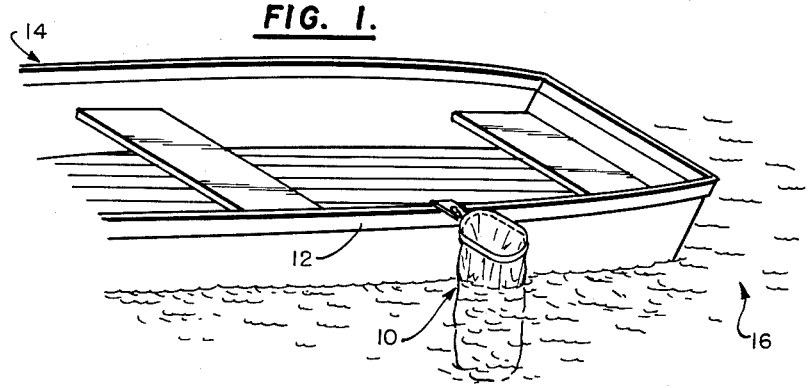
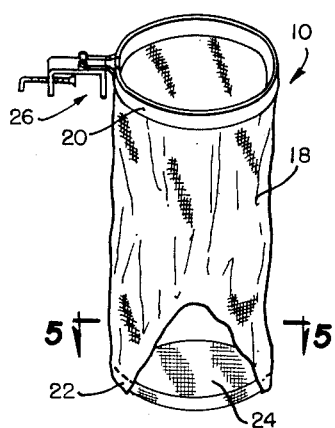
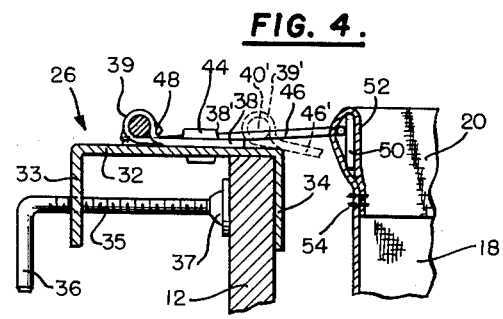
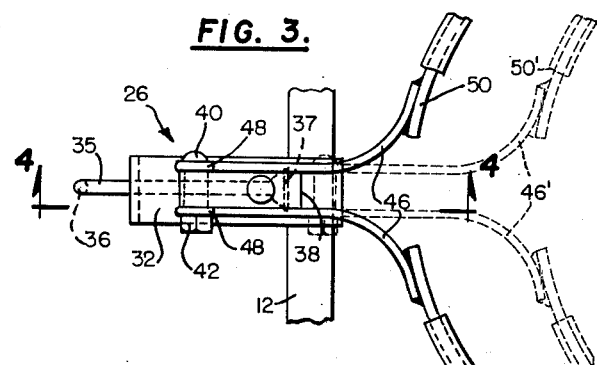
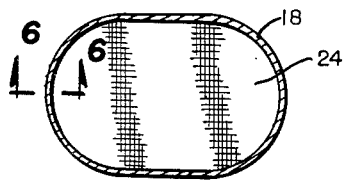
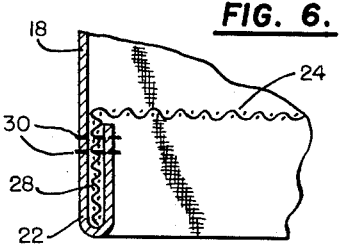
INVENTOR
Herman L. Stull
BY *Kimmel & Crowell*
ATTORNEYS United States Patent Office 3,141,257
Patented July 21, 1964

3,141,257
LIVE FISH CONTAINER
Herman L. Stull, 629-B Main St., Watsonville, Calif.
Filed Apr. 1, 1963, Ser. No. 269,309
2 Claims. (Cl. 43—55)

This invention relates to a live fish container and relates more particularly to a sack for maintaining fish or bait in a live condition.

A primary object of this invention is the provision of an improved live fish container which is sturdy and durable in construction, reliable and efficient in operation, and relatively simple and inexpensive to manufacture, assemble, utilize and maintain.

Another object of this invention is the provision of a sack for retaining fish or bait in live condition by allowing water to pass thereinto while preventing the escape of the fish or bait.

A further object of the instant invention is to provide a live fish container having an inset bottom screen member to prevent the same from snagging on branches, stumps or other debris in the water.

Yet another object of this invention is the provision of a device of the character described having a clamp means in combination therewith for removably securing the sack to a portion of a boat or the like to allow it to depend therefrom so that a portion of the sack is filled with water.

A still further object of this invention is the provision of a live fish container having a clamp means and associated adjustable mounting means which will allow the container to swivel about a vertical axis as well as pivot about a horizontal axis; the assembly of parts of the mounting means being variable such that the horizontal clearance between the boat gunwhale and the near side of the sack is variable, as is also the horizontal relationship between the vertical axis of the inwardly positioned sack and a vertical plane passing through the longitudinal center line and keel of the boat to thus provide great flexibility in use and safer boat operation.

Other and further objects reside in the combination of elements, arrangement of parts and features of construction.

Still other objects will in part be obvious and in part be pointed out as the description of the invention proceeds and as shown in the accompanying drawing wherein:

FIGURE 1 is a perspective view of the live fish container of the instant invention in use, showing a portion of a boat to which the container is removably clamped;

FIGURE 2 is an enlarged isometric view of the live fish container, with parts broken away for illustrative clarity;

FIGURE 3 is an enlarged fragmentary top plan view particularly of the clamping means of the instant invention, showing certain hidden parts in dotted lines, and with the mounting means adjusted for maximum horizontal clearance between a boat gunwhale and the container shown by longer dash lines;

FIGURE 4 is a fragmentary cross-sectional view taken substantially on line 4—4 of FIGURE 3, and with the mounting means adjusted for maximum horizontal clearance between a boat gunwhale and the container shown by longer dash lines;

FIGURE 5 is a transverse cross-sectional view of a sack which is elliptical in cross section taken on a plane similar to line 5—5 of FIGURE 2; and FIGURE 6 is an enlarged fragmentary view taken on a vertical line 6—6 of FIGURE 5 particularly showing the manner of securing the screen member to the sack.

Like reference characters refer to like parts throughout the several views of the drawing.

Referring now to the drawing in general and more particularly to FIGURE 1, the live fish container of the instant invention is designated generally by the reference numeral 10 and is shown as secured to one of the gunwhales 12 of a row boat or the like 14 in depending relationship so that a portion thereof is carried below the surface of the water 16 in use.

The live fish container is comprised basically of a sack 18 having an open mouth edge portion 20 and an open bottom edge portion 22, a pervious screen member 24 secured to the sack 18 inset from the bottom edge portion 22 and a clamping means 26 for removably securing the container 10 to the boat 14 or the like.

The sack 18 is substantially cylindrical or oval in form although it may have any desired shape and is preferably formed of a heavy cotton duck material. Alternately, the sack 18 may be made of a fine mesh plastic material or the like.

The screen member 24 is a conventional wire mesh material and has a downwardly extending peripheral flange 28 of preferably aproximately one inch long. The bottom edge portion 22 of the sack 18 is reverted as shown particularly in FIGURE 6 and stitched at 30 to the peripheral flange 28 of screen member 24 to secure these elements together. By insetting the screen member 24 as shown it is possible to avoid fouling of the container 10 with obstructions such as branches, stumps or other debris in the water 16.

Clamp means 26 includes a substantially U-shaped plate 32 having downwardly depending flanges 33 and 34 through the former of which a tightening member 35 having a handle means 36 and a bearing plate 37 is threadably secured. A mounting plate 38 has a ring shaped arcuate portion 39 to which a pivot pin such as bolt 40 is secured by means such as nut 42. The mounting plate 38 is rotatably secured to the U-shaped plate 32 by a vertical axis swivel member 44, and the sack 18 is pivotally secured to the mounting plate 38 by a bifurcated member 46 having end portions 48 bent in a ring shape to form aligned apertures or rings received around the pivot pin 40 between the head thereof and the nut 42. The bifurcated member 46 may pass leftward beyond swivel 44 to pivot pin 40, when the sack is in its outboard position as shown in solid lines in FIGURES 3 and 4, and in this position of factory assembly there is a minimum horizontal clearance between the vertical adjacent portions of the gunwhale 12 of a boat and the closest portion of the sack. For greater horizontal clearance between boat and sack, the bifurcated member 46 may be factory assembled to bolt and nut pivot pin 40 when the latter is in its more outboard position as is shown by the dotted lines in FIGS. 3 and 4. The actual outboard position of the sack with respect to the gunwhale may thus be varied by twice the horizontal distance between the axes of pivot 40 and swivel 44. For temporary increase in clearance in the field from the solid line arrangement of FIGS. 3 and 4, the mounting plate 38 and sack 18 may be swiveled 180° about swivel 44, and then the sack may be pivoted 180° clockwise about 40. The net will then have greater clearance with the boat but it will be in an inverted position with bottom edge 22 and screen 24 above mouth edge 20. The inverted net can be changed to a container fillable from above, by passing 22, 24 downward through mouth edge 20, thus providing a sack inside out as compared to FIG. 2. For a permanent increase in clearance from the assembly of the solid lines of FIGS. 3 and 4, it is only necessary for a user to disassemble pivot 40 from the arcuate portion 39 of plate 38. This disassembly releases end portions 48 of the bifurcated member 46. Mounting plate 38 is then swiveled 180° about 44 so that the plate is in the dotted position 38' with 39 in position 39'. The ends of 46 are then aligned with the arcuate portion 39', and the pivot 40 is reinserted at 40'. Tightening nut 42 will then complete the reassembly giving greater clearance as shown by the dotted portions of FIGS. 3 and 4. Opposite ends of the bifurcated member 46 are welded or the like to a metal band 50 received in a continuous loop means 52 formed in the mouth edge portion of the sack 18 by reverting the latter and stitching it to itself as at 54. Note particularly FIGURE 4. It is to be understood that both the pivotal connection and the swivel connection are relatively tight to frictionally engage the elements in adjusted relationship while allowing for movement of the container 10 in any direction with regard to the object such as the boat 14 to which it is clamped.

The use and operation of the live fish container of the instant invention will now be apparent. By positioning the U-shaped plate 32 over the gunwale 12 of the boat 14 so that the downwardly depending flange 34 overlies the same, the tightening member 35 may be threadably adjusted by means of the handle portion 36 so that the bearing member 37 abuts the opposite side of the gunwale 12 to fixedly secure and clamp the container 10 thereto. The height or angle of the container 10 may be readily adjusted by pivoting the same upwardly or downwardly about the pivot pin 40 and swiveling the same about the vertical axis of the swivel member 44 until the sack 18 is positioned as desired in the water 16. Since the water 16 may readily pass through the screen member 24 the interior of the sack 18 will be partially filled with water. Either bait such as minnows or the like or fish caught by the fishermen may then be inserted through the mouth of the sack 18 and will be retained alive in the water within the container. It is to be understood that the screen member 24 will be of sufficiently fine mesh so that bait may not escape therefrom.

It is to be observed that whenever the clearance between gunwale and outboard position of the sack is changed, there is an inverse change between the gunwale and the inboard position of the sack with respect to the same gunwale. This inboard change may be at times more important than the outboard clearance, as when the sack is within the boat and a large game fish is being carried in the sack or being removed therefrom. The more stable and safer boat operation arises when the weight of the occupant and the fish load equally straddle a vertical plane through the keel, and as boats and canoes are of various widths or beams, the above disclosed variable assemblages and uses aid in safer boating and fishing.

It is also to be understood that although the live fish container 10 has been disclosed throughout as secured to a gunwale of a row boat, it can be readily modified for attachment to any other type of boat or article.

It will now be seen that there is herein provided an improved live fish container which satisfies all the objectives of the instant invention and others, including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative and not in a limiting sense.

I claim:
1. A live fish container including a cylindrical sack having a totally unobstructed open top mouth with a looped horizontal edge portion,
a band which is within the looped edge portion of the sack for supporting and reinforcing the sack,
the sack having a totally unobstructed open bottom shaped identical in plan with the mouth,
a wire screen member of uniform mesh with a central horizontal body and a single thickness vertically downwardly extending integral peripheral flange,
the central horizontal screen body being inset from the open bottom as an aid in preventing the same from snagging on branches, stumps or other debris in the water,
a reverted screen protecting edge around the bottom of the sack of approximately the same height as the vertical flange of the screen, the reverted sack edge encompassing the flange for its full height, and stitches near the top of the flange attaching the flange securely within the reverted edge,
the supporting band terminating with a pair of horizontally spaced apart end portions formed in vertical planes into horizontally aligned rings,
a clamp, a horizontal plate, a horizontal axis pivot pin, vertical axis means to swivelly and centrally mount the plate to and above the clamp, means to mount the center of the pivot pin to and at a spaced distance from the center of the plate,
and means to tightly engage each one of the aligned rings with an end of the pivot pin to frictionally engage the end portions of the supporting band and the plate in adjusted relationship,
whereby the band and the sack are swivelable for movement in a horizontal plane at adjustable distances with respect to the central swiveling means of the plate, the total adjustment being twice said spaced distance.

2. A live fish container including a vertical axis cylindrical sack with an open top and a rim protected screen bottom,
a sack supporting band attached within the edge of the top and terminating at a side with a pair of horizontally spaced radially extending end portions, the ends of the latter being formed in horizontally spaced vertical planes into horizontally aligned substantially closed rings,
clamping means including an inverted U-plate having downwardly depending flanges and an intermediate horizontal portion,
screw means associated with the depending flanges whereby a general support member such as the gunwale of a boat may be clamped therebetween,
a horizontal pivot member, a horizontal mounting plate, a vertical axis swivel member projecting upward from said intermediate horizontal portion and horizontally swiveling said mounting plate on said intermediate portion, the clearances at the swivel member being such as to frictionally hold the plates in a desired angular relationship,
said mounting plate supporting at an arcuate end thereof which is horizontally spaced from the swivel member, the midportion only of said horizontal pivot member, the latter member being embraced near each of its ends by one of said substantially closed rings,
and means at the ends of the horizontal pivot member to hold the rings of the sack supporting band frictionally tight against the arcuate support of the horizontal pivot member, whereby a variation in horizontal clearance between the vertical adjacent portions of a general support, as the gunwale of a boat, and the closest portion of the cylindrical sack at outboard position, is obtainable by positioning the arcuate support end of the mounting plate in its most inboard position or its most outboard position, and the clamping means, the mounting plate, and their associated structures will allow the sack to swivel for a complete full circle about a vertical axis, as well as to pivot horizontally at least a half circle, regardless of whether the arcuate support end of the mounting plate is arranged in position for a minimum or maximum clearance between the general support and the sack.

References Cited in the file of this patent

UNITED STATES PATENTS

| | | |
|---|---|---|
| 947,282 | Hall | Jan. 25, 1910 |
| 992,756 | Cross | May 23, 1911 |
| 2,323,318 | Farkas | July 6, 1943 |
| 2,384,101 | Kruse | Sept. 4, 1945 |
| 2,544,049 | Sawner | Mar. 6, 1951 |
| 2,603,028 | Roberts | July 15, 1952 |
| 2,726,477 | Firkins | Dec. 13, 1955 |
| 2,795,888 | Garland | June 18, 1957 |
| 2,949,691 | Johnson | Aug. 23, 1960 |